United States Patent
Thierry et al.

(10) Patent No.: US 8,759,475 B2
(45) Date of Patent: Jun. 24, 2014

(54) CONTINUOUS PRODUCTION OF POLYAMIDES

(75) Inventors: Jean-Francois Thierry, Francheville (FR); Sébastien Lomel, Saint Just Chaleyssin (FR); Vincent Mollet, Vernaison (FR); Matthieu Helft, Oullins (FR); Cédric Fillon, Lyons (FR)

(73) Assignee: Rhodia Operations, Aubervilliers (FR)

( * ) Notice: Subject to any disclaimer, the term of this patent is extended or adjusted under 35 U.S.C. 154(b) by 689 days.

(21) Appl. No.: 12/593,080

(22) PCT Filed: Mar. 25, 2008

(86) PCT No.: PCT/EP2008/053491
§ 371 (c)(1),
(2), (4) Date: Feb. 2, 2010

(87) PCT Pub. No.: WO2008/125429
PCT Pub. Date: Oct. 23, 2008

(65) Prior Publication Data
US 2010/0144986 A1 Jun. 10, 2010

(30) Foreign Application Priority Data

Mar. 27, 2007 (FR) ..................... 07 02199

(51) Int. Cl.
*C08G 69/04* (2006.01)
*C08G 69/16* (2006.01)
*C08G 69/28* (2006.01)

(52) U.S. Cl.
USPC ............. 528/310; 526/64; 528/312; 528/323; 528/324; 528/325; 528/326; 528/328; 528/329.1; 528/335; 528/336

(58) Field of Classification Search
USPC ............ 526/64; 528/310, 312, 323, 324, 325, 528/326, 328, 329.1, 335, 336
See application file for complete search history.

(56) References Cited

U.S. PATENT DOCUMENTS 4,537,949 A * 8/1985 Schmidt et al. ............... 528/335
6,316,588 B1 11/2001 Mohrschladt et al.

FOREIGN PATENT DOCUMENTS

DE 19804023 A1 8/1999

* cited by examiner

*Primary Examiner* — Ana Woodward
(74) *Attorney, Agent, or Firm* — Dentons US LLP

(57) ABSTRACT

Polyamides, e.g., polyhexamethylene adipamide, are continuously produced via the following stages:

Stage 1: into and through a reactor, polycondensing a liquid stream which contain the polyamide monomer(s) at a pressure P1 greater than atmospheric pressure, the stream of material at the outlet of the reactor including a vapor phase which contains steam and a liquid phase which at least contains the product of polycondensation;

Stage 2: feeding the outlet stream of material into a chamber, evacuating at least a portion of the vapor phase therefrom and recovering at least the liquid phase which at least contains the product of polycondensation, the pressure P2 in the chamber being regulated at a set value such that it is greater than atmospheric pressure and the residence time of said liquid phase in the chamber being less than 5 minutes; and Stage 3: pressure reducing at least the liquid phase which at least contains the stream of polycondensation product recovered during Stage 2.

32 Claims, No Drawings

CONTINUOUS PRODUCTION OF POLYAMIDES

CROSS-REFERENCE TO PRIORITY/PCT APPLICATIONS

This application is a national phase of PCT/EP 2008/053491, filed Mar. 25, 2008 and designating the United States (published in the French language on Oct. 23, 2008, as WO 2008/125429 A1; the title and abstract were also published in English), and claims priority under 35 U.S.C. §119 of FR 0702199, filed Mar. 27, 2007, each hereby expressly incorporated by reference in its entirety and each assigned to the assignee hereof.

The present invention relates to a process for the manufacture of polyamide. The polyamide is of the type of those obtained by polycondensation from diacids and diamines and/or of the type of those obtained by polycondensation from lactams and/or amino acids. The process is entirely suitable for the manufacture of polyhexamethylene adipamide.

Polyamides are polymers of great industrial and commercial importance. Thermoplastic polyamides are obtained either by reaction between two different monomers or by polycondensation of a single monomer. The invention applies, on the one hand, to polyamides resulting from two different monomers, the most important polyamide of which is poly(hexamethylene adipamide). Of course, these polyamides can be obtained from a mixture of diacids and diamines. Thus, in the case of poly(hexamethylene adipamide), the main monomers are hexamethylenediamine and adipic acid. However, these monomers can comprise up to 25 mol % of other diamine or diacid monomers or even amino acid or lactam monomers. The invention applies, on the other hand, to polyamides resulting from a single monomer, the most important polyamide of which is polycaprolactam. Of course, these polyamides can be obtained from a mixture of lactams and/or amino acids. Thus, in the case of polycaprolactam, the main monomer is caprolactam. However, these monomers can comprise up to 25 mol % of other amino acid or lactam monomers or even diamine or diacid monomers.

The class of polyamides resulting from two different monomers is generally manufactured by using, as starting material, a salt obtained by mixing a diacid with a diamine in stoichiometric amount, generally in a solvent, such as water.

Thus, in the manufacture of poly(hexamethylene adipamide), adipic acid is mixed with hexamethylenediamine, generally in water, to produce hexamethylenediammonium adipate, better known under the name of Nylon salt or "N salt".

The solution of the N salt is optionally concentrated by partial or complete evaporation of the water.

The class of polyamides resulting from a single monomer is generally manufactured by using, as starting material, a lactam and/or an amino acid, and a small amount of water; the proportion by weight of water is generally between 1 and 15%.

The polyamide is obtained by heating, at high temperature and high pressure, an aqueous solution of the monomers (for example, a solution of Nylon salt as described above) or a liquid comprising the monomers, in order to evaporate the water while avoiding any formation of solid phase so as to prevent the mixture from setting solid.

Several processes using different types of devices are known for the manufacture of polyamides.

Processes are known during which the polycondensation is carried out in the molten phase comprising the solution of N salt or the liquid comprising the monomers, the reaction stream flowing at low speed in the lower part of a reactor in a horizontal axis. The upper part of the reactor comprises steam, evaporated from the starting solution or produced by the polycondensation reaction. The molten reaction stream is in the presence of a gas phase which exhibits substantially the same pressure throughout the reactor. The steam is partially evacuated, so as to control the pressure. The polycondensation reaction is thus carried out at a pressure of approximately 0.5-2.5 MPa at a temperature of approximately 215-300° C. The reaction stream is subsequently subjected to a nonadiabatic pressure reduction down to atmospheric pressure by passing through a flasher, that is to say a heated tubular device exhibiting a sufficient exchange surface area to prevent crystallization of the product. During this operation, the residual water present in the material stream is evaporated. The vapor and the liquid stream are subsequently separated in a gas/liquid separator. The polycondensation is continued in the molten phase at atmospheric or reduced pressure so as to achieve the desired degree of progression.

Other processes are known during which the polycondensation is carried out in the molten phase in a tubular reactor exhibiting a high length/diameter ratio. The reaction stream flows at high speed, occupying the entire cross section of the reactor. The hydrodynamic state of this reactor is such that the steam resulting from the reaction is mixed with a material stream, for example in the form of bubbles. The speed, the composition, the pressure and the temperature of the steam gas phase varies along the reactor. The surface area for exchange between reaction medium and heat-exchange fluid is high, which promotes transfers of heat. The residence times are generally shorter than in the processes described above.

Tubular reactors are generally coils included in a chamber comprising a heat-exchange fluid or included in a jacket for circulation of heat-exchange fluid. Such plants exhibit the advantage of being highly compact.

Processes for the manufacture of polyamide in a tubular reactor are described in the documents FR 1 505 307, FR 1 352 650 and FR 1 520 190. In the processes described, a stream of a solution of N salt is injected at a pressure of the order of 1 to 5 MPa into a coil, the diameter of which gradually increases.

The stream of bulk material undergoes polycondensation, releasing steam. It undergoes a gradual pressure reduction along the reactor by head loss.

The polyamide exits from the coil at atmospheric pressure with a high degree of progression of polymerization and thus a high melt viscosity sufficient to ensure its buildup in weight in a subsequent finishing stage. These processes exhibit the advantage of employing highly compact plants and of being very easy to carry out.

However, they do exhibit disadvantages. At the end of the coil, the speed of flow of the molten polyamide is low and that of the steam is high. The flow state can be annular, with a very rapid stream of vapor at the centre and a slow stream of very viscous molten polyamide at the periphery. Solid deposits of decomposed polyamide form by accumulation over time on the walls. These deposits are capable of unexpectedly detaching, thus detrimentally affecting the final quality of the polyamide. Furthermore, they modify the flows and thus the functioning of the process. They make it necessary to frequently clean the plants and thus to shut down production and dismantle, resulting in high maintenance costs. Furthermore, these processes are not very flexible. This is because the functioning thereof (pressure, temperature, progression) is directly related to the geometry of the plants. A modification to the throughputs according to production requirements modifies the flow and heat exchange states. In particular, for a given geometry, when the throughput decreases, the flow state has a tendency to promote the formation of deposits.

The present invention provides an improved continuous process for the manufacture of polyamide, in particular in a tubular reactor. The process employs a compact plant. The process is flexible and easy to carry out.

To this end, the invention provides a process for the continuous manufacture of a polyamide comprising at least the following stages:

Stage 1: Polycondensation in a reactor of a liquid stream comprising the monomers, at a pressure P1 greater than atmospheric pressure, the stream of material at the outlet of the reactor being composed of a vapor phase comprising at least steam and of a liquid phase comprising at least the polycondensation product Stage 2: Feeding the stream of material to a chamber, evacuating at least a portion of the vapor phase from the chamber and recovering at least the liquid phase comprising at least the polycondensation product, the pressure P2 in the chamber being regulated at a set value such that it is greater than atmospheric pressure and that the residence time of the liquid phase in the chamber is less than 5 minutes, preferably less than 1 minute Stage 3: Pressure reduction of at least the liquid phase comprising at least the stream of polycondensation product recovered during Stage 2.

The manufacturing process according to the invention is a process for the manufacture of polyamides of the type of those obtained from dicarboxylic acids and diamines and/or of the type of those obtained by polycondensation from lactams and/or amino acids.

The lactam or amino acid monomers can, for example, be chosen from caprolactam, 6-aminohexanoic acid; 5-aminopentanoic acid, 7-aminoheptanoic acid, aminoundecanoic acid or dodecanolactam. The preferred lactam is caprolactam.

The dicarboxylic acid monomers can, for example, be chosen from glutaric acid, adipic acid, suberic acid, sebacic acid, dodecanedioic acid; 1,2- or 1,3-cyclohexanedicarboxylic acid; 1,2- or 1,3-phenylenediacetic acid; 1,2- or 1,3-cyclohexanediacetic acid; isophthalic acid; terephthalic acid; 4,4'-benzophenonedicarboxylic acid; 2,5-naphthalenedicarboxylic acid; and p-(tert-butyl)isophthalic acid. The preferred dicarboxylic acid is adipic acid.

The diamine monomers can, for example, be chosen from hexamethylenediamine; butanediamine; 2-methylpentamethylenediamine; 2-methylhexamethylenediamine; 3-methylhexamethylenediamine; 2,5-dimethylhexamethylenediamine; 2,2-dimethylpentamethylenediamine; nonanediamine; 5-methylnonanediamine; dodecamethylenediamine; 2,2,4- and 2,4,4-trimethylhexamethylenediamine; 2,2,7,7-tetramethyloctamethylenediamine; meta-xylylenediamine; para-xylylenediamine; isophoronediamine; diaminodicyclohexylmethane and $C_2$-$C_{16}$ aliphatic diamines which can be substituted by one or more alkyl groups. The preferred diamine is hexamethylenediamine.

This is a continuous manufacturing process, the conversion is taking place on streams of material. The streams of material undergo conversions during the various stages carried out in one or more parts. The process comprises at least the three successive stages described above. They can obviously comprise others upstream or downstream of them or even between them.

The main conversion carried out during the implementation of the process is generally the polycondensation of a dicarboxylic acid with a diamine or of a lactam and/or amino acid. This conversion is well known to a person skilled in the art, for example for the manufacture of polyamide 66 from adipic acid and hexamethylenediamine or for the manufacture of polyamide 6 from caprolactam. This polycondensation generally releases water in the vapor form.

The degree of progression of the polycondensation is defined as follows:

Degree of progression (%)=[(number of moles of amide units formed)/(number of moles of initial reactive functional groups in deficit)]*100

The number of moles of initial reactive functional groups in deficit is:

either the number of moles of carboxylic acid functional groups resulting from the monomers initially present in the reaction medium, if the reactive functional groups in deficit initially in this medium are the carboxylic acid functional groups (with respect to the amine functional groups), or the number of moles of amine functional groups resulting from the monomers initially present in the reaction medium, if the reactive functional groups in deficit initially in this medium are the amine functional groups (with respect to the carboxylic acid functional groups).

Depending on the degree of progression of the polycondensation, the product obtained can be described as amidate, polyamide oligomer, polyamide prepolymer or polyamide.

The polycondensation is preferably mainly carried out during Stage 1. It is during this stage that the degree of progression increases the most. The polycondensation can, however, continue during Stage 2 or Stage 3 or during subsequent stages.

The degree of progression of the polycondensation on conclusion of Stage 3 is advantageously greater than 60%, preferably greater than 90%.

The temperature during Stage 1 is such that the stream of material does not solidify.

The polycondensation requires a supply of heat, the heat temperature generally being far below the melting point of the final polymer. The plants used for the implementation of the process thus comprise heat supply means for the purpose of maintaining the reaction medium at a sufficient temperature to prevent the appearance of a solid phase. They likewise comprise all the means which may be necessary for its implementation, such as pumps, analytical means, control means, valves, means for introducing or storing the stream of material, or static mixers.

For the implementation of Stage 1, of polycondensation, a liquid stream comprising the monomers of the polyamide to be prepared is introduced into the reactor. In order to prepare a polyamide of the PA66 type, the monomers are dicarboxylic acids and diamines. In order to prepare a polyamide of PA6 type, the monomers are lactams and/or amino acids. These compounds constitute the main monomers. An aqueous solution may be involved. The acid and the diamine are advantageously in substantially stoichiometric proportions, in the case of the preparation of a polyamide of PA66 type.

The dicarboxylic acid is preferably adipic acid and the diamine is preferably hexamethylenediamine. The stream can comprise other monomers, such as other dicarboxylic acids or other diamines, or amino acids or lactams, such as caprolactam.

The lactam is preferably caprolactam. The stream can comprise other monomers, such as other lactams and/or amino acids, or dicarboxylic acids or diamines, such as hexamethylenediamine or adipic acid.

For the preparation of a polyamide of PA66 type, the stream fed in is preferably a stream of an aqueous solution of N salt, comprising adipic acid or one of its ionic forms and hexamethylenediamine or one of its ionic forms, in substantially stoichiometric proportions. For the preparation of a polyamide of PA6 type, the stream fed in is preferably composed of a mixture of caprolactam and of water. The stream fed in advantageously comprises 50 to 100% by weight of monomers; for example, it preferably comprises 50 to 80% of N salt in the case of the production of PA66.

Such a solution can, for example, be obtained by dissolution of a solid salt or by dissolution of the acid and of the diamine with monitoring of the stoichiometry using an appropriate means, for example pH-metric or near infrared analysis. The solution may have been subjected to a preheating operation before introduction into the reactor. The solution may have been subjected to a concentrating operation, by evaporation of water, and/or a preheating operation before introduction into the reactor.

The stream comprising the dicarboxylic acid and the diamine can also be obtained by heating the solid salt or the acid and the diamine.

The stream comprising the monomers is fed to the reactor at a pressure greater than atmospheric pressure and at a temperature such that the stream is liquid.

The stream comprising the monomers is fed to the reactor. The stream of material flows in the reactor. During the progression of the stream in the reactor, in particular in the tubular reactor, polycondensation occurs between the diamine and the diacid to form polyamide chains, with the formation of water, a portion of which can evaporate.

The stream of material, before the outlet of the reactor, can be composed solely of a liquid phase comprising the polycondensation product and dissolved water. In this case, a vapor phase is produced, comprising water which is evaporated from the liquid phase, for example by employing a valve immediately before the outlet of the reactor.

The stream of material at the outlet of the reactor comprises a liquid phase comprising at least the polycondensation product in the molten form and optionally dissolved water and a vapor phase comprising at least steam. The hydrodynamic state in the reactor will depend on the arrangement chosen and on the operating conditions, it being possible for the gas phase comprising steam and the liquid phase to be mixed or not to be mixed. A gas/liquid flow then exists. The two phases flow cocurrentwise in the reactor.

The reactor is maintained at a temperature sufficient for polycondensation to take place. The reactor can advantageously be fed with a preheated stream, the temperature which is close to the temperature for the start of polycondensation.

The pressure P1 in the reactor is generally between 0.5 and 3.5 MPa and the temperature is generally between 180 and 320° C.

According to a specific embodiment of the process of the invention, in Stage 1, the liquid stream is fed at a pressure P'1 greater than atmospheric pressure, the stream of material at the outlet of the reactor being at a pressure P'''1 lower than the feed pressure P'1 and greater than atmospheric pressure.

The feed pressure P'1 of the stream into the reactor is advantageously greater than 1 MPa, preferably greater than 1.5 MPa, more preferably still greater than 1.8 MPa or even 3.0 MPa, for example if the production throughput is high.

The reactor is preferably a tubular reactor. It advantageously exhibits a length to diameter ratio of greater than 100. It is preferably greater than 500. In the reactor, the superficial velocity of the liquid phase is preferably greater than 0.1 m/second. The velocity is defined by the ratio of the throughput by volume of the liquid phase to the cross section of the flow of the stream of material. The residence time of the liquid in the reactor is advantageously greater than 1 minute, preferably greater than 5 min. It preferably does not exceed 60 minutes.

The degree of progression of the polycondensation at the outlet of the reactor is advantageously greater than 60%, preferably greater than 90%. The length and the diameter of the tubular reactor and the flow rate can be adjusted and controlled in order to obtain the desired degree of progression.

The pressure in the polycondensation reactor generally decreases by head loss from the inlet towards the outlet of the reactor. The outlet pressure P'''1 is, however, greater than atmospheric pressure. It is advantageously greater than 0.5 MPa, preferably greater than 1.0 MPa.

According to a preferred embodiment of the invention, the tubular reactor is a coil with a length to diameter ratio of greater than 500. The length of the coil is preferably greater than 200 m. The internal diameter is preferably less than 200 mm.

The coil can comprise several parts with different diameters, the diameter increasing gradually or in sequential fashion from the inlet towards the outlet of the reactor. Such a device makes it possible to reduce the pressure in a controlled and gradual fashion and also to reduce overall the difference in pressure between the inlet pressure and the outlet pressure of the reactor. The length/diameter ratio of the reactor when it comprises several parts of different diameter is advantageously greater than 10, preferably greater than 500.

The tubular reactor is generally placed in a chamber or a jacket comprising a heat-exchange fluid. The heat-exchange fluid is, for example, Therminol VP-1®. When the heat-exchange fluid is in the vapor form, it is maintained in this form using a boiler. The reactor is, for example, a helical coil placed in a chamber thus heated.

According to the invention, the liquid phase comprising the polycondensation product and the vapor phase comprising steam at the outlet of the reactor are fed to a device intended to evacuate at least a portion of the steam.

The liquid phase comprising the polycondensation product will be directed to the bottom of the chamber and the vapor phase will occupy the upper part. The pressure P2 in the chamber is greater than atmospheric pressure. It is preferably between 0.5 and 2.5 MPa. The pressure P2 is less than or equal to the pressure P'''1.

The evacuation device comprises a means for evacuating the vapor phase and a means for recovering the liquid phase comprising the polycondensation product in the molten form.

The pressure P2 in the chamber can be regulated by the evacuation throughput of the vapor phase. In order to increase the pressure, it is possible, for example, to reduce the degree of opening of the valve for evacuation of the vapor phase.

The pressure P2 in the chamber is advantageously regulated so that there is no retention of the liquid phase in the chamber. It is preferable for the residence time of the liquid phase in the evacuation chamber to be reduced to a minimum, indeed even for it to be virtually zero (that is to say, less than a few seconds, indeed even a few tenths of a second, or of the order of a few seconds, indeed even a few tenths of a second). The residence time of the liquid phase in the chamber is comparable to a passage time of this liquid phase in the chamber.

According to a preferred embodiment, the evacuated vapor stream, and thus also the pressure in the chamber, are subject to the control of liquid level detection in the chamber where the evacuation is carried out, more particularly in the part of the chamber intended for the recovery of the liquid phase. A set level of the liquid phase in the part of the chamber intended for the recovery of the liquid phase, for example a liquid height in this chamber part, is chosen. When the liquid level exceeds the set level, a valve for evacuation of the vapor phase is actuated in order to limit the stream of vapor phase evacuated and thus to increase the pressure in the chamber. The increase in the pressure promotes the flow of the liquid phase comprising the polycondensation product into the pressure-reducing device of Stage 3, which has the effect of reducing the liquid level in the chamber. The set level is advantageously chosen so that the amount of liquid phase in the evacuation chamber is at a minimum. For example, if the set level is a given liquid height in the part of the chamber intended for the recovery of the liquid phase, this set height will preferably be chosen to be as low as possible. It is possible, if this level is adjusted to a sufficiently low value, for a portion of the vapor phase originating from the chamber to accompany the liquid phase into the device of Stage 3.

One method which can be used to determine the residence time of the liquid phase in the chamber consists in injecting a tracer upstream of the chamber, in recovering it downstream of the chamber and in measuring the time between the injection and the recovery of the tracer. The tracer is an inert substance which does not interact chemically or physically with the reaction medium. This method is known to a person skilled in the art and is described in particular in the work "Génie de la réaction chimique" [Engineering of the Chemical Reaction], Daniel Schweich, published by Technique et Documentation, 2001, pp. 137-141. The residence time of the liquid phase in the chamber can also be determined, in the case where the liquid level in the part of the chamber intended for the recovery of the liquid phase is being controlled, by the ratio of the volume of this part of the chamber to the throughput by volume of liquid.

The evacuation device is preferably a device of cyclone type. Such a device is known to a person skilled in the art. It comprises a cylindrical part into which the stream of material resulting from Stage 1 is fed tangentially, a conical part intended for the recovery of the liquid phase comprising the polycondensation product, and a device for evacuation of the vapor phase. In the conical part, the stream of material forms a film on the walls of the cyclone. According to a useful form, the cyclone is provided with means for measuring the level of the liquid polycondensation product recovered, the operating pressure of the cyclone being subject to control by this measurement. When a set level is exceeded, the pressure in the cyclone is then increased by reducing the throughput for evacuation of the vapor phase. The cyclone can be heated by a heat-exchange fluid.

During Stage 3, the stream of polycondensation product resulting from Stage 2 is subjected to a nonadiabatic pressure reduction in order to achieve a pressure generally in the vicinity of atmospheric pressure. This pressure reduction is preferably carried out by head loss in a heated tubular device proportioned so that the flow generates a head loss substantially equal to the difference between the operating pressure desired for the chamber of Stage 2 and atmospheric pressure. This tubular device is advantageously placed in a chamber comprising a heat-exchange fluid. The pressure-reducing device can be a helical coil composed, if appropriate, of several sections. The same chamber may be involved as that comprising the tubular reactor. This arrangement exhibits the advantage of being highly compact.

It is possible for the degree of progression of the polycondensation to increase during this stage.

The stream on conclusion of Stage 3 advantageously exhibits a degree of progression of the polycondensation of greater than 90%.

The polycondensation product resulting from Stage 3 is a molten polymer or prepolymer. It can comprise a vapor phase essentially composed of steam which may have been formed and/or evaporated during the pressure-reducing phase.

This product can be subjected to vapor-phase separating and finishing stages in order to achieve the degree of polycondensation desired. The separation of the vapor phase can, for example, be carried out in a device of cyclone type. Such devices are known.

The finishing consists in maintaining the polycondensation product in the molten state, under a pressure in the vicinity of atmospheric pressure or under reduced pressure, for a time sufficient to achieve the desired degree of progression. Such an operation is known to a person skilled in the art. The temperature of the finishing stage is advantageously greater than or equal to 200° C. and in all cases greater than the solidification temperature of the polymer. The residence time in the finishing device is preferably greater than or equal to 5 minutes.

The stream of liquid resulting from Stage 3 or from the finishing stage can also be subjected to a stage of postcondensation in a solid phase. This stage is known to a person skilled in the art and makes it possible to increase the degree of polycondensation to a desired value.

The polyamide obtained at the end of the finishing stage can be cooled and put into the form of granules. It preferably exhibits, after the finishing stage or stage of postcondensation in the solid phase, a degree of progression of the polycondensation of greater than 99%.

According to a specific alternative form of the invention, the process comprises several successive stages of polycondensation/evacuation of the liquid phase and of the vapor phase which precede the stage of pressure reduction to the pressure in the vicinity of atmospheric pressure. According to a specific embodiment of the invention, the process comprises, between Stage 2 and Stage 3, at least one series of successive stages of polycondensation i and of evacuation j which are respectively analogous to Stage 1 and Stage 2, starting from the liquid phase resulting from Stage 2, the pressures in the tubular polycondensation reactor of stage i and in the evacuation chamber of stage j being greater than atmospheric pressure and the inlet pressure P'i in the tubular polycondensation reactor of stage i being greater than the outlet pressure P"i of the latter. Stages i and j can be repeated at least twice, the feed stream of the polycondensation stage i+1 resulting from the evacuation stage j. The pressure Pj is less than or equal to the pressure P"i. In practice, several tubular polycondensation reactors and several evacuation devices, such as the cyclones described above, are arranged in series.

Preferably they are placed in the same chamber comprising a heat-exchange fluid. The parameters, in particular of pressure, temperature, residence time or geometry, in the various polycondensation reactors are chosen according to the degree of polycondensation desired on conclusion of each polycondensation stage and according to the final degree of polycondensation desired. Each evacuation device, such as a cyclone, is employed at a pressure greater than atmospheric pressure and the pressure inside each cyclone is regulated so that there is little or no retention of the liquid phase in the evacuation chamber, for example by subjecting the throughput of evacuated vapor phase to the control of a set level of liquid present in the evacuation chamber.

The polyamide obtained by the process of the invention in the molten form can be directly formed or can be extruded and granulated for a subsequent forming after melting.

The polyamide can be used for a large number of applications, in particular for the manufacture of yarns, fibres or filaments or for forming articles by injection moulding or extrusion. It can in particular be used in industrial plastic compositions.

The process of the invention has many advantages. It is a continuous process which makes it possible to obtain a uniform product, on the one hand, and great flexibility in the operating throughput, by adjusting the throughput for evacuation of the vapor phase in the evacuation device, while limiting the fouling of the plant by solid residues resulting from decomposed polymer. This process minimizes the number of rotating machines to be employed (for example the number of pumps) and pollution by organic compounds present in the effluents (for example hexamethylenediamine present in the vapor phase). In addition, the pressurized gas phase evacuated in the evacuation device, essentially composed of steam, can be easily recovered and reused as energy source, for example for heating the feed stream of monomers.

Other details or advantages of the invention will become more apparent in the light of the example given below.

Viscosity number: Measured in 90% formic acid according to Standard ISO 307:2003.

EXAMPLE 1157 kg/h of an aqueous solution comprising 70% by weight of hexamethylene-diammonium adipate are fed at 150° C. into a spirally wound pipe made of stainless steel situated in a cylindrical chamber with a diameter of 1 m and a height of 4 m heated by a thermal fluid at 280° C. This pipe, with an internal diameter of 40.9 mm and a length of 440 meters, conveys the reaction stream to a separator of cyclone type, also heated by a thermal fluid at 280° C. The stream exiting from the pipe and entering the separator is composed of an aqueous solution of prepolymer with a viscosity number of approximately equal to 30 ml/g and of a vapor phase predominantly composed of water.

The duration of the reaction in the pipe is approximately 15 minutes and the pressure at the inlet of the pipe is equal to 2.6 MPa. The pressure in the separator is regulated at 1.9 MPa using a pressure-reducing valve which makes it possible to remove a portion of the vapor phase at a level of 346 kg/h. The remaining stream, composed of the liquid phase and of the balance of vapor phase, is evacuated into a pressure-reducing device composed of a series of spirally wound pipes which is also incorporated in the heated chamber and which makes it possible to reduce the pressure of the medium down to a pressure in the vicinity of atmospheric pressure. This series of pipes consists of a first winding with a length of 163 meters and an internal diameter of 32.5 mm, followed by a second winding with a length of 27 meters and an internal diameter of 36.6 mm. The duration of the pressure-reducing stage is approximately 4 minutes. A vapor phase and a liquid prepolymer with a viscosity number of 47 ml/g are obtained.

This reaction mixture is introduced at a temperature in the vicinity of 280° C. into a vertical finisher operating at a pressure in the vicinity of atmospheric pressure and equipped with an outlet for the vapor phase. A polymer with a viscosity number equal to 131 ml/g is withdrawn from this finisher at a throughput of 698 kg/h.

The invention claimed is:

1. A process for the continuous production of a polyamide from a monomer or two different monomers, comprising the following stages:

Stage 1: polycondensing said monomer or monomers in a reactor having an outlet by feeding a liquid stream comprising the monomer or monomers into said reactor, wherein said reactor is at a pressure P1 greater than atmospheric pressure and polycondensation of said monomer or monomers occurs as the liquid stream moves through the reactor to form a stream of material at the outlet, wherein the stream of material comprises a vapor phase and a liquid phase, wherein said vapor phase comprises steam, and wherein said liquid phase comprises a polycondensation product of said monomer or monomers, and wherein moving said liquid stream through said reactor occurs at a speed resulting in a residence time of the liquid phase in the reactor of greater than 5 minutes;

Stage 2: feeding said stream of material from the outlet of the reactor into a chamber, evacuating a portion of the vapor phase therefrom, recovering at least the liquid phase comprising the polycondensation product of said monomer or monomers, and promoting flow of the liquid phase into a pressure-reducing device of Stage 3, said chamber having a pressure P2 regulated at a set value such that it is greater than atmospheric pressure and the residence time of said liquid phase in the chamber is less than 1 minute; and Stage 3: reducing the pressure of at least the liquid phase comprising a stream of polycondensation product recovered from the chamber during Stage 2.

2. The process as defined by claim 1, where, in Stage 1, the liquid stream is fed into said reactor at a pressure P'1 greater than atmospheric pressure, and the stream of material at the outlet of the reactor is at a pressure P'''1 which is lower than the feed pressure P'1 and greater than atmospheric pressure.

3. The process as defined by claim 1, where, in Stage 2, the pressure P2 in said chamber is regulated at a set value such that there is no retention of the liquid phase therein.

4. The process as defined by claim 1, wherein said reactor is a tubular reactor.

5. The process as defined by claim 4, wherein the liquid stream fed to the tubular reactor is at a pressure P'1 of greater than 1 MPa.

6. The process as defined by claim 4, wherein the stream of material at the outlet of the tubular reactor is at a pressure P'''1 of greater than 0.5 MPa, and at a temperature of greater than 200° C.

7. The process as defined by claim 4, wherein the tubular reactor comprises one or more segments of different diameters, with a length/diameter ratio greater than 100.

8. The process as defined by claim 4, wherein the tubular reactor comprises a plurality of segments, and the diameter of said segments increases from the inlet towards the outlet of the reactor.

9. The process as defined by claim 4, comprising, between Stage 2 and Stage 3, wherein the liquid phase resulting from Stage 2 undergoes at least one series of successive stages of polycondensation i and of evacuation j which are respectively analogous to Stage 1 and Stage 2, the pressures in the tubular polycondensation reactor of stage i and in the evacuation chamber of stage j is greater than atmospheric pressure and the inlet pressure P'i in the tubular polycondensation reactor of stage i is greater than the outlet pressure P'''i of stage j.

10. The process as defined by claim 1, wherein said monomer or monomers comprise a dicarboxylic acid and a diamine.

11. The process as defined by claim 10, wherein said polyamide comprises a polyamide 66 or a copolyamide, the majority of the recurring structural units of which comprise polyamide 66 recurring structural units, the dicarboxylic acid being adipic acid and the diamine being hexamethylenediamine.

12. The process as defined by claim 1, wherein said monomer or monomers comprise a lactam and/or an amino acid.

13. The process as defined by claim 12, wherein said polyamide comprises a polyamide 6 or a copolyamide, the majority of the recurring structural units of which comprise polyamide 6 recurring structural units, the lactam being caprolactam and/or the amino acid being aminohexanoic acid.

14. The process as defined by claim 1, wherein the liquid stream comprising said monomer or monomers comprises an aqueous solution.

15. The process as defined by claim 1, wherein the liquid stream comprises from 50% to 100% by weight of monomer or monomers.

16. The process as defined by claim 1, wherein the polycondensation product of said monomer or monomers at the outlet of the reactor has a degree of progression greater than 90% for a polyamide 66.

17. The process as defined by claim 1, wherein the liquid phase moves through said reactor at a rate having a superficial velocity, where the superficial velocity of the liquid phase in the reactor is greater than 0.1 m/s.

18. The process as defined by claim 1, wherein the reactor is placed in a chamber or a jacket comprising a heat-exchange fluid.

19. The process as defined by claim 1, wherein the pressure P2 in the chamber where evacuation is carried out is regulated at a set value such that P2 ranges from 0.5 to 2.5 MPa.

20. The process as defined by claim 1, wherein said evacuation of said vapor phase is controlled by a set level of the liquid phase in a part of the chamber intended for the recovery of the liquid phase in the pressure-reducing device of Stage 3, and the portion of the vapor phase being evacuated from said chamber is reduced when the set level in the part of the chamber is exceeded.

21. The process as defined by claim 1, wherein the evacuation is carried out in a device of cyclone type comprising a cylindrical part into which the stream of material is fed, a conical part intended for the recovery of the liquid phase of the polycondensation product and a device for evacuation of the vapor phase.

22. The process as defined by claim 1, wherein the pressure reduction of at least the liquid phase comprising at least the stream of polycondensation product is carried out in a tubular device optionally comprising several segments with increasing cross sections.

23. The process as defined by claim 22, wherein the tubular pressure-reducing device is placed in a chamber or a jacket comprising a heat-exchange fluid.

24. The process as defined by claim 23, wherein a generator of thermal fluid in the form of vapor is present in the chamber.

25. The process as defined by claim 1, wherein the stream of polycondensation product resulting from Stage 3 has a degree of progression of polycondensation greater than 90% for a polyamide 66.

26. The process as defined by claim 1, wherein Stage 3 is followed by a finishing stage, in the molten phase, or by a postcondensation stage, in the solid phase, for a time sufficient to achieve a desired degree of progression of polycondensation.

27. The process as defined by claim 26, wherein the finishing stage or the postcondensation stage is preceded by a stage of separation of the vapor phase present in the stream of polycondensation product exiting from Stage 3.

28. The process as defined by claim 27, wherein the finishing stage comprises a finishing device, and said finishing device is heated using a heat-exchange fluid.

29. A process for the continuous production of a polyamide from a monomer or two different monomers, comprising the following stages:
Stage 1: polycondensing said monomer or monomers in a reactor having an outlet by feeding a liquid stream comprising the monomer or monomers into said reactor, wherein said reactor is at a pressure P1 greater than 1.5 MPa, and polycondensation of said monomer or monomers occurs as the liquid stream moves through the reactor to form a stream of material, wherein the stream of material comprises a vapor phase and a liquid phase, wherein said vapor phase comprises steam, and wherein said liquid phase comprises a polycondensation product of said monomer or monomers, and wherein moving said liquid stream through said reactor occurs at a speed resulting in a residence time of the liquid phase in the reactor of greater than 5 minutes;
Stage 2: feeding said stream of material from the outlet of the reactor into a chamber, evacuating a portion of the vapor phase therefrom, recovering at least the liquid phase comprising the polycondensation product of said monomer or monomers, and promoting flow of the liquid phase into a pressure-reducing device of Stage 3, said chamber having a pressure P2 regulated at a set value such that it is greater than atmospheric pressure and the residence time of said liquid phase in the chamber is less than 5 minutes; and
Stage 3: reducing the pressure of at least the liquid phase comprising a stream of polycondensation product recovered from the chamber during Stage 2.

30. A proces for the continuous production of a polyamide from a monomer or two different monomers, comprising the following stages:
Stage 1: polycondensing said monomer or monomers in a reactor having an outlet by feeding a liquid stream comprising the monomer or monomers into said reactor, wherein said reactor is at a pressure P1 greater than 1.5 MPa, and polycondensation of said monomer or monomers occurs as the liquid stream moves through the reactor to form a stream of material at the outlet, wherein the stream of material at the outlet of the reactor comprises a vapor phase and a liquid phase, wherein said vapor phase comprises steam, and said liquid phase comprises a polycondensation product of said monomer or monomers, and wherein moving said liquid stream through said reactor occurs at a speed resulting in a residence time of the liquid phase in the reactor of greater than 5 minutes;
Stage 2: feeding said stream of material from the outlet of the reactor into a chamber, evacuating a portion of the vapor phase therefrom, recovering at least the liquid phase comprising the polycondensation product of said monomer or monomers, and promoting flow of the liquid phase into a pressure-reducing device of Stage 3, said chamber having a pressure P2 regulated at a set value such that it is greater than atmospheric pressure and the residence time of said liquid phase in the chamber is less than 1 minute; and
Stage 3: reducing the pressure of at least the liquid phase comprising a stream of polycondensation product recovered from the chamber during Stage 2.

31. A proces for the continuous production of a polyamide from a monomer or two different monomers, comprising the following stages:
Stage 1: polycondensing said monomer or monomers in a reactor having an outlet by feeding a liquid stream comprising the monomer or monomers into said reactor, wherein said reactor is at a pressure P1 greater than 1.5 MPa, and polycondensation of said monomer or monomers occurs as the liquid stream moves through the reactor to form a stream of material at the outlet, wherein the stream of material comprises a vapor phase and a liquid phase, wherein said vapor phase comprises steam, and said liquid phase comprises a polycondensation product of said monomers, and wherein said moving of said liquid stream through said reactor occurs at a speed resulting in a residence time of the liquid phase in the reactor of greater than 5 minutes;

Stage 2: feeding said stream of material from the outlet of the reactor into a chamber, evacuating a portion of the vapor phase therefrom, recovering at least the liquid phase comprising the polycondensation product of said monomer or monomers, and promoting flow of the liquid phase into a pressure-reducing device of Stage 3, said chamber having a pressure P2 regulated at a set value such that it is greater than atmospheric pressure and the residence time of said liquid phase in the chamber is a few seconds; and Stage 3: reducing the pressure of at least the liquid phase comprising a stream of polycondensation product recovered from the chamber during Stage 2.

32. A proces for the continuous production of a polyamide from a monomer or two different monomers, comprising the following stages:

Stage 1: polycondensing said monomer or monomers in a reactor having an outlet by feeding a liquid stream comprising the monomer or monomers into said reactor, wherein said reactor is at a pressure P1 greater than 1.5 MPa, and polycondensation of said monomer or monomers occurs as the liquid stream moves through the reactor to form a stream of material at the outlet, wherein the stream of material at the outlet of the reactor comprises a vapor phase and a liquid phase, wherein said vapor phase comprises steam, and said liquid phase comprises a polycondensation product of said monomers, and wherein said moving of said liquid stream through said reactor occurs at a speed resulting in a residence time of the liquid phase in the reactor of greater than 5 minutes;

Stage 2: feeding said stream of material from the outlet of the reactor into a chamber, evacuating a portion of the vapor phase therefrom, recovering at least the liquid phase comprising the polycondensation product of said monomer or monomers, and promoting flow of the liquid phase into a pressure-reducing device of Stage 3, said chamber having a pressure P2 regulated at a set value such that it is greater than atmospheric pressure and the residence time of said liquid phase in the chamber is a few tenths of a second; and Stage 3: reducing the pressure of at least the liquid phase comprising a stream of polycondensation product recovered from the chamber during Stage 2.

* * * * *